Dec. 15, 1953  D. C. GOLDBERG ET AL  2,662,397
HARDNESS TESTER
Filed Aug. 3, 1951  2 Sheets-Sheet 1

INVENTOR
DAVID C. GOLDBERG
ROBERT E. SCHAFER

BY *M. M. Gould*

ATTORNEY

Dec. 15, 1953  D. C. GOLDBERG ET AL  2,662,397
HARDNESS TESTER

Filed Aug. 3, 1951  2 Sheets-Sheet 2

INVENTOR
DAVID C. GOLDBERG
ROBERT E. SCHAFER
BY *M. W. Gould*
ATTORNEY

Patented Dec. 15, 1953

2,662,397

UNITED STATES PATENT OFFICE 2,662,397

HARDNESS TESTER

David C. Goldberg and Robert E. Schafer, Lancaster, Pa., assignors to Hamilton Watch Company, Lancaster, Pa.

Application August 3, 1951, Serial No. 240,114

4 Claims. (Cl. 73—78)

This invention relates to an apparatus for nondestructively hardness testing of minute instrument and timepiece parts.

The object of the present invention is to provide a hardness tester for small parts, using the parts themselves as the indentor, on a precalibrated end quenched cylindrical metallic bar.

It is a further object of the present invention to provide a hardness tester in which the hardness will be directly read from a calibrated scale and will not require conversion tables.

It is a still further object of the present invention to provide an apparatus for testing the hardness of small parts using an end quenched cylindrical metallic bar, the hardness of which may be definitely controlled between desired limits to provide an enlargement of the critical hardness condition.

At the present time it is extremely difficult to carry out a test of the hardness of minute instrument and timepiece parts, such as balance wheel pivots and the like, and all the practiced methods are destructive of the part being tested. The part must be metallurgically mounted and polished and micro-hardness tested by the penetration of a diamond point. This depth of penetration must be measured and such reading must be converted by a conversion table. This method is time consuming and in the case of very small parts very undependable. The present invention seeks to overcome these difficulties by providing a cylinder, the hardness of which is graduated from one end to the other end, by regulating the angle of contact and the weight bearing on the contact point, the part to be tested is dragged along the surface of the cylinder and the point at which it fails to penetrate the surface is clearly seen through a microscope and a direct reading is made on an accompanying scale.

The invention is shown in the accompanying drawings in which.

Figure 1:
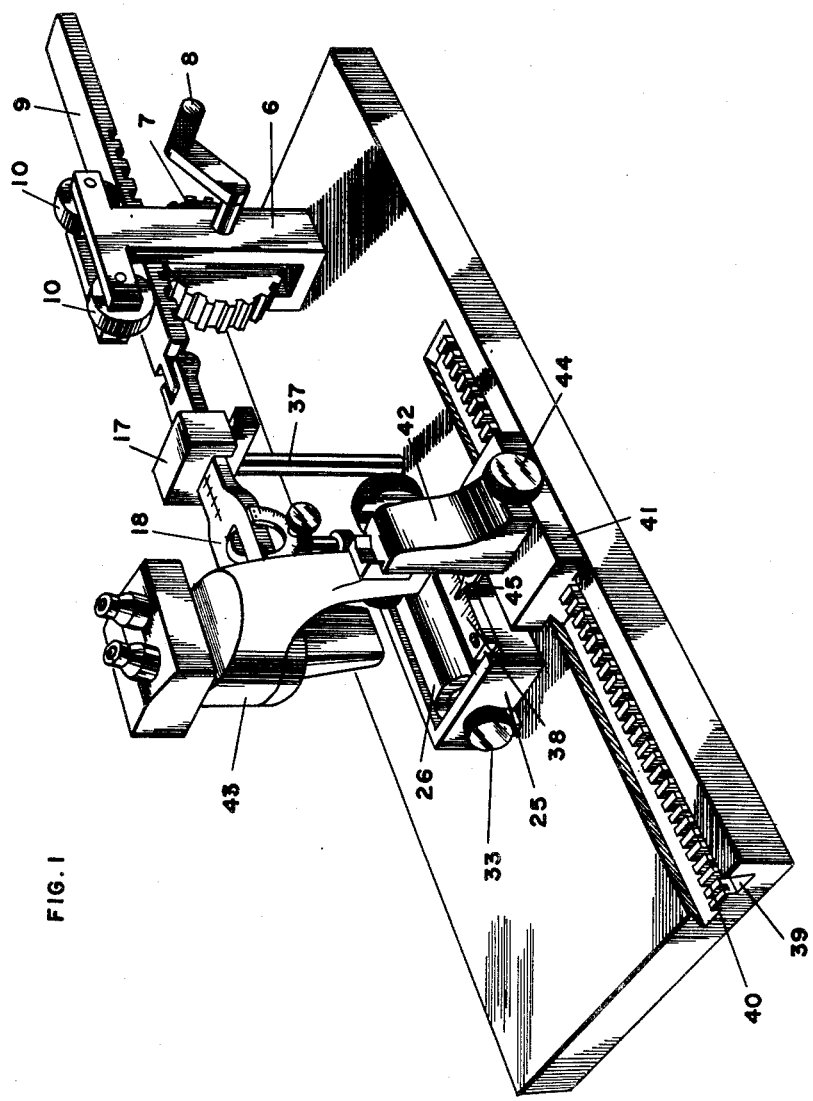
Figure 1 is a perspective view of the apparatus.
Figure 2:
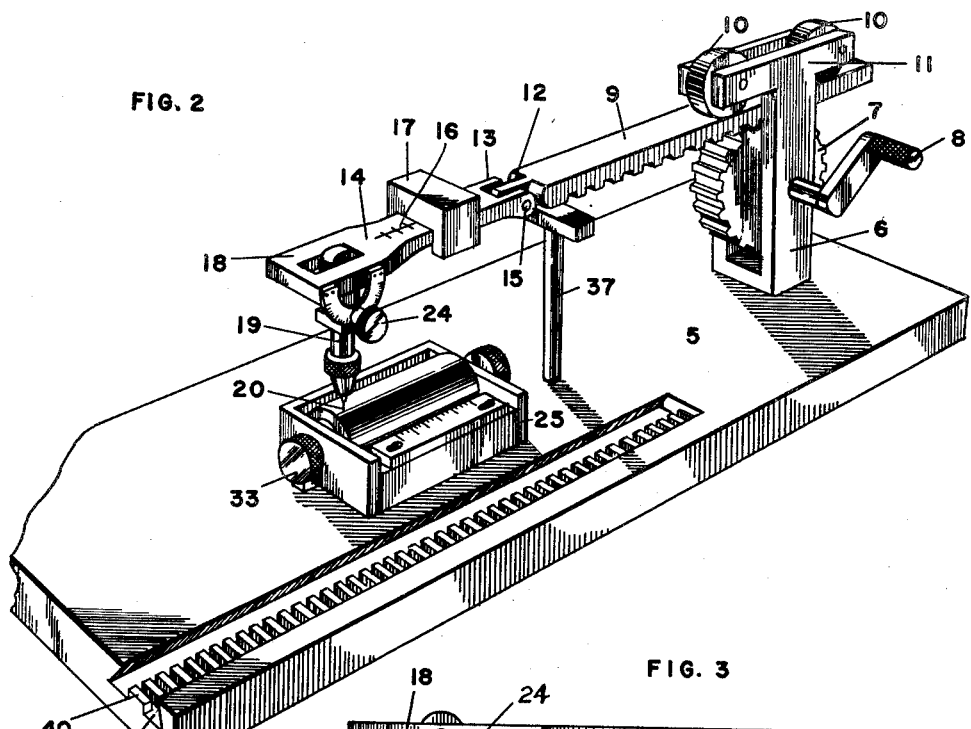
Figure 2 is a similar view with the microscope removed so that the contact of the piece to be tested with the cylinder can be clearly seen.
Figure 3:
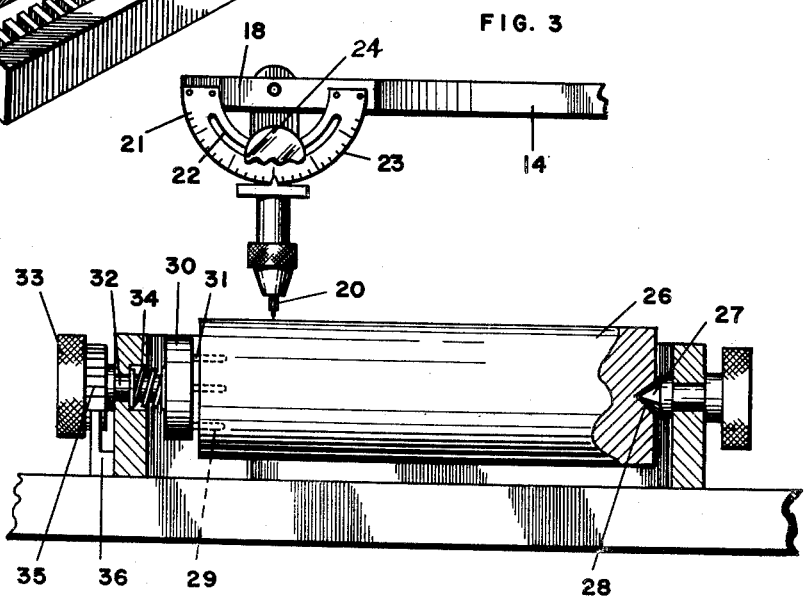
Figure 3 is a detail view showing the cylinder mounting.

Referring particularly to the drawing, a base 5 supports a standard 6 in which is journalled a gear 7 adapted to be turned by a hand crank 8. Connected to the gear and movable by it is a rack 9 which is held in contact with the gear by rollers 10 journalled in the cross bar 11 of the frame 7 and bearing upon the back of the rack 9.

The forward end of the rack is formed with a tongue 12 fitting into a yoke 13 on the bar 14. A pivot pin 15 passing through the yoke 13 and the tongue 12 permits the bar 14 to be swung upward on the pivot 15 to a position at right angles to the rack 9. The middle surface of the bar 14 is formed with scale markings 16 and supports a weight 17.

The forward end of the bar is enlarged to form an eye 18 in which is pivotally mounted a chuck 19 for carrying the pivot 20 to be tested. Secured to the outer edge of the eye is a semiannular scale 21 having an arcuate slot 22 and scale markings 23. A set screw 24 passing through the arcuate slot and into the chuck 19 permits the chuck and its carried pivot pin to be set at various angles to the bar 14.

A boxlike housing 25 is carried on the base 5 and partially houses a cylinder 26 of the end quenched test bar type having a hardness range from a Rockwell C66 to Rockwell C40. The degree of hardness of the cylinder may be, of course, varied, depending on the type of instrument which is desired to be tested. It will thus be seen that a very efficient test could be run in which the hardness of one end of the bar varied little from that of the other end to provide a long travel for the instrument to be tested and a very sharply defined critical area at which the hardness could be determined. This cylinder is supported at one end by a center pin 27 passing into a conical depression 28 in the end of the cylinder. The other end of the cylinder is formed with three equally angular spaced holes 29 into which pins 31 carried by disc 30 fit. The disc 30 is keyed to a shaft 32 mounted at one end of the box 25 and rotates with the shaft under the action of the thumb wheel 33. The disc 30 with the pins 31 is also movable longitudinal of the shaft 32 against the action of the spring 34 to permit the removal of the cylinder 26. A ratchet wheel 35 and a dog 36 controls the turning of the cylinder 26 by the thumb wheel 33.

Formed in the base 5 is a track 39 having an integrally formed central rack 40. Moving longitudinally of the track is a carriage 41 supporting a standard 42, which in turn supports a microscope 43. Movement of the carriage 40 is controlled by a hand wheel 44 operating a pinion (not shown) which engages the rack 39. A pointer 45 carried on the carriage 40 is synchronized with the microscope 42 and indicates a reading on the scale 26 corresponding to that point on the cylinder which is being observed by the microscope. In use the bar 14 is swung up on the pivot 15, the bar and the rack resting on the standard 37 and a pivot pin 20 fitted to the chuck 19. The bar 14 is then swung down until the pivot 20 is in contact with the cylinder 26 and the weight 17 adjusted manually on the bar 14 in accordance with the scale 16. The pivot pin is then moved longitudinally of the cylinder 26 by turning the hand crank 8 and the point at which the pivot pin scratches the hard surface of the cylinder 26 is noted by the scale 38 and a hardness reading is accordingly taken. Should reading be desired on a different pivot pin, the cylinder is rotated one notch by the thumb wheel 33 and the procedure repeated. In this manner a great many readings may be taken on a single cylinder and when the cylinder has made a complete rotation, its surface may be honed and reused.

What is claimed is:

1. An apparatus for testing the hardness of minute instrument and timepiece parts, comprising an end quenched cylinder having a surface of graduated hardness, a chuck for holding the part to be tested, means for supporting the chuck held part above and in contact with the cylinder, means connected to said chuck for varying the angle of contact between the part to be tested and the axis of the cylinder, means for moving said part longitudinally of the cylinder and in contact with the surface thereof, and optical means adjustable longitudinally with regard to said cylinder for observing the point at which the part scratches the surface of the cylinder.

2. An apparatus for testing the hardness of minute instrument and timepiece parts, comprising a base, an end quenched cylinder having a surface of graduated hardness mounted for controlled rotation on said base, a scale mounted on said base adjacent said cylinder and indicating the varying surface hardness of said cylinder, a chuck carried above said cylinder, means for moving said chuck longitudinally of said cylinder, said chuck supporting a part to be tested and holding said part in contact with the surface of said cylinder, means connected to said chuck for varying the angle of contact of said part with the surface of said cylinder, means for varying the force with which said part contacts said cylindrical surface, a microscope secured to said base for longitudinal movement parallel to said cylinder for observing the exact point at which the part scratches the cylindrical surface, and a pointer coupled to said microscope to indicate a hardness reading on said scale.

3. An apparatus for testing the hardness of minute instrument and timepiece parts, comprising a base, an end quenched cylinder mounted for controlled rotation on said base, said cylinder having a graduated hardened surface, a scale mounted on said base adjacent said cylinder and indicating the graduated surface hardness, a chuck, an arm pivotally supporting said chuck above said cylinder, a rack connected to said arm, a pinion geared to said rack, means for positioning said chuck supporting the part to be tested at any desired angular contact relation with said cylinder, a hand crank for turning said pinion and moving said rack and said chuck held part longitudinally of and in contact with said cylindrical surface, and optical means mounted on said base for longitudinal movement relative to said cylinder for observing the point at which said part scratches said cylindrical surface during its longitudinal travel.

4. An apparatus for testing the hardness of minute instrument and timepiece parts, comprising a base, a box framework supported on said base, an end quenched cylinder having a surface of graduated hardness removably mounted for controlled rotation within said framework, a scale carried by said framework and indicating the hardness of said graduated surface, a chuck adapted to support the part to be tested above and in contact with the surface of said cylinder, means for adjusting said chuck to vary the angle of contact of said part with said cylinder, means for imposing a load on said chuck to vary the pressure between said part and said cylindrical surface, means for moving said chuck held part longitudinally of and in contact with said cylindrical surface, means mounted on said base for longitudinal movement relative to said cylinder for observing the exact point at which said part scratches said cylindrical surface, a pointer connected to and coinciding with said observing means for indicating on said scale the degree of hardness of said surface at said scratch point, and means for rotating said cylinder to present a fresh surface directly below said chuck.

DAVID C. GOLDBERG.
ROBERT E. SCHAFER.

References Cited in the file of this patent

UNITED STATES PATENTS

| Number | Name | Date |
| --- | --- | --- |
| 2,182,235 | Polushkin | Dec. 5, 1939 |
| 2,279,264 | Hoffman | Apr. 7, 1942 |
| 2,335,235 | Clifton | Nov. 30, 1943 |

OTHER REFERENCES

Article entitled "Recent Scratch Hardness Methods" by S. R. Williams, in Instruments, vol. 10, September 1937, pp. 237–238.